United States Patent [19]

Berardus van Amelsfort

[11] Patent Number: 4,718,697

[45] Date of Patent: Jan. 12, 1988

[54] IDENTIFICATION DEVICES

[75] Inventor: Petrus A. Berardus van Amelsfort, Ashhurst, New Zealand

[73] Assignee: Allflex International Limited, Palmerston North, New Zealand

[21] Appl. No.: 872,551

[22] Filed: Jun. 10, 1986

[30] Foreign Application Priority Data

Jun. 11, 1985 [NZ] New Zealand ............... 212275

[51] Int. Cl.⁴ .............. B65D 85/00; B65D 85/30; G08C 17/00; K44C 3/00
[52] U.S. Cl. .................. 283/107; 283/74; 206/309; 40/2 A
[58] Field of Search .............. 283/107, 81, 74; 40/1.5, 2 R, 2 A; D2/22; 428/13, 916; 206/309; 340/174.1

[56] References Cited

U.S. PATENT DOCUMENTS

| 964,288 | 7/1910 | Fowler | 281/18 |
| 1,963,648 | 6/1934 | Canter | 283/74 |
| 3,111,152 | 11/1963 | Goessling | 40/2 A |
| 4,379,507 | 4/1983 | Llabres | 206/309 |
| 4,479,579 | 10/1984 | Miklos | 283/74 |
| 4,512,093 | 4/1985 | Kolton | 40/2 R |

FOREIGN PATENT DOCUMENTS

| 1233243 | 1/1967 | Fed. Rep. of Germany | 40/2 A |
| 728518 | 4/1955 | United Kingdom | 40/2 R |

Primary Examiner—E. R. Kazenske
Assistant Examiner—Paul M. Heyrana, Sr.
Attorney, Agent, or Firm—Blakely, Sokoloff, Taylor & Zafman

[57] ABSTRACT

An electronic device is located within a carrier. The carrier comprises a body portion and attachment portion whereby the body portion can be attached to an object to be identified. A flexible coupling portion couples the attachment portion with the body portion. The body portion is formed in two sections which are fastened together forming a cavity in which the electronic device is located.

8 Claims, 6 Drawing Figures

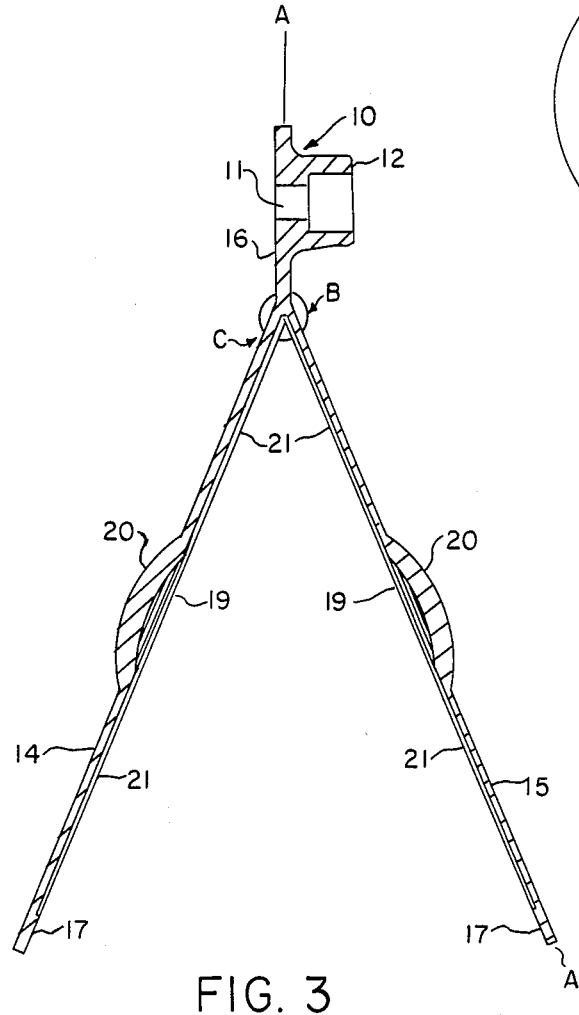
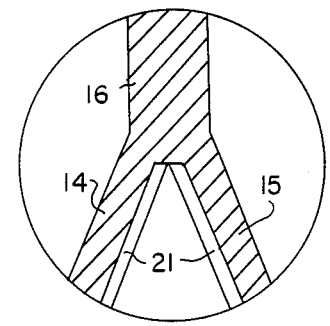
FIG. 3
FIG. 4

IDENTIFICATION DEVICES

This invention relates to an identification device and more particularly to a device which can be attached to an object, whether the object be animate or inanimate, to be identified.

The visual identification of animals and inanimate objects by attachment thereto of a tag bearing visually readable indicia is well known. This is especially so in the field of animal identification where the visual identification of an animal by a tag (whether it be one or two piece) attached to the ear of the animal is a well developed art.

Electronic identification devices have now been developed which can be attached in a suitable manner to an object to be identified whereby an interrogator device can electronically derive data from the identification device. This data can then be presented in readable form to enable an operator of the interrogator to attribute identifying information to the object. The data can also be processed by software driven computer means and correlated with information pertaining to the identified object.

The electronic identification device is thus required to be firmly attached to the object, usually by a suitable carrier which not only enables attachment to be effected but also protects the device and if present its associated antenna. The type of carrier utilised depends on the type of electronic device being used and the environment in which the device is to be used.

For example when the carrier is to be attached to an animal the physical weight and dimensions of the carrier become a critical factor as does the requirement that as far as possible the carrier is not prone to being snagged on immovable objects. It is well recognised that one of the main factors involved in a tag becoming separated from the object to which it is attached is the tag becoming snagged on an immovable object. Accordingly in the tagging art it is usually for the tag or its component parts to be as flexible as possible so that the tag can flex when snagged and thus become unsnagged.

The desirability for the tag or tag components to be flexible can lead to problems when the tag or a component thereof is to form a carrier for an electronic device. This is especially so when the device incorporates antenna in its construction as any undue flexing can lead to fracture of the antenna.

In addition the electronic device is usually a delicate device requiring protection, however, efforts to provide such protection can lead away from flexibility and add to the weight of the carrier.

The aim of the present invention is to provide an electronic identification device having an electronic device mounted by a carrier, the carrier having flexibility characteristics and the whole device being of light weight.

Broadly is one aspect the invention provides an electronic identification device comprising a carrier and an electronic device located within said carrier, the carrier comprising a body portion, attachment means whereby the body portion can be attached to an object to be identified and a flexible coupling portion coupling said attachment means with said body portion, the body portion being formed in two sections, said two sections when fastened together forming a cavity in which said electronic device is located.

In the preferred form of the invention the attachement means, coupling portion and the two sections of the body portion are formed integrally preferably from a plastics material such a polyurethane. The two body sections are preferably placed in face to face contact and fastened together by high frequency welding. Preferably both body sections have a recessed portion which combine when the body sections are joined together to form the internal cavity in which the electronic device and, if required, antenna reside.

In the following more detailed description of the invention reference will be made to the electronic identification device being of a type which is readily attachable to an animal, preferably the ear thereof, with attachment being effected by use of the attachment means of the ear tag which is described and claimed in our New Zealand Patent Specification No. 162710 or New Zealand Patent Specification No. 213378.

Such a device can also, using the same attachment means, be used for attachment of the device to other objects. It will, however, be appreciated by those skilled in the art that different attachment means can be used when the device is being attached to either animals or inanimate objects and thus the attachment means itself is not a critical feature of the invention. In addition reference will be made to the identification device as being a device employing SAW technology, however, once again this is by way of example only.

In the following more detailed description of the invention reference will be made to the accompanying drawings in which:

FIG. 3 is a cross-sectioned elevation view of the carrier (in enlarged scale) shown in FIG. 1, FIG. 4 is a detail view of "B" in FIG. 3.

Figures 1, 2:
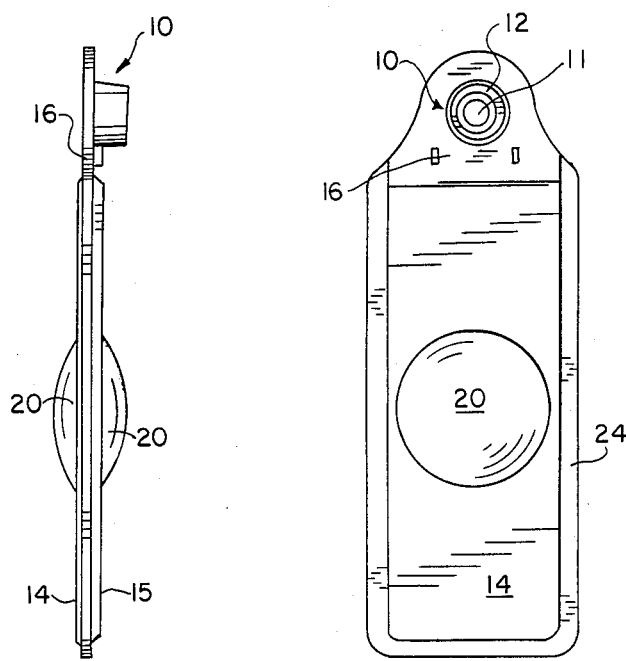
FIG. 1 is an elevation view of the carrier of the device.
FIG. 2 is a side view of the carrier shown in FIG. 1.
Figure 5:
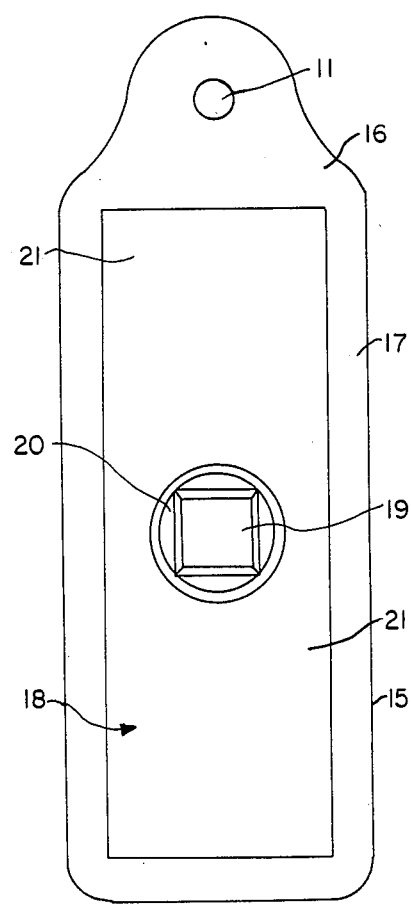
FIG. 5 is a view along line A—A of FIG. 3.

In the drawings there is shown a carrier C formed with attachment means 10 comprising a female opening 11 and boss portion 12 such as used in the female component of a two piece tag arrangement of the type described in our New Zealand Patent Specification No. 162710. The complete carrier can thus be attached to the ear of an animal by use of a male component mating into the opening 11 in the manner described in our New Zealand Patent Specification No. 162710.

The carrier C is preferably formed by a single moulding from a plastics material. Because of its proven performance in the animal tagging field the plastics material is preferably polyurethane.

Carrier C comprises a body portion 13 formed of two body sections 14 and 15 which in the preferred form are identical. These body sections 14 and 15 are joined to a coupling portion 16 which is in turn joined to the attachment means 10. As can be seen from FIG. 4 the thickness of the coupling portion 16 is preferably less than the combined thicknesses of the body portions 14 and 15.

Body portions 14 and 15 are essentially panels which have formed on their inner faces 17 a recess 18. This recess 18 incorporates a substantially centrally disposed shaped and deeper recess 19 in which the electronic device will lie. To provide protection to the electronic device the thickness of the body section is increased in the vacinity of recess 19 and to this end a protruding generally circular shaped portion 20 projects from the outer surface of the body section. Recess 18 is completed by a shallow recess 21 which surrounds deeper recess 19 and extends longitudinally along the elongate body section.

The electronic device is in the preferred form of the invention a device constructed and operative in accordance with SAW technology. The device and its associated antenna are constructed as a separate unit which is shaped and dimensioned to fit within the internal cavity formed by recesses 18. Accordingly, the SAW device will be positioned within the deeper recess 19 and the associated antenna within the longitudinally extending shallow recess portions 21.

To assemble the identification device a prefinished electronic device and associated antenna is located within the recess 18 of one body section and the two body sections 14 and 15 are brought into face to face contact so that the electronic device is effectively encapsulated within the body portion 13. The two body sections 14 and 15 are welded together by suitable means such as high frequency welding forming a weld line 24.

The carrier C is mounted with an object to be identified by using a male component (not shown) which can be of the type described in our New Zealand Patent Specification No. 162710. The carrier is thus firmly held in place, however, movement of the body portion 13 relative to the mounting means 10 can readily take place by virtue of the flexible coupling portion 16. In addition the body portion is itself capable of some flexing due to its thin cross-section and the resilient material from which it is formed. As generally any flexing will occur in the area of the coupling portion 16 then undue flexing of the actual body is not likely to occur or be necessary and thus damage to the encapsulated antenna will be prevented.

In the area of the SAW device and its coupling to the antenna flexing is prevented by the increased material thickness of shaped protrusion 20. This increased thickness also provides protection from damage caused by impacts etc.

The carrier is also suitable for carrying electronic devices other than those embodying SAW technology. Where such other devices do not incorporate large antenna then the need for shallow recesses 21 may not arise and hence the body sections would only incorporate the deep and shaped recesses 19. Without the need for recesses 21 the physical dimensions of the body sections (especially in length) can be suitably reduced.

Figure 6:
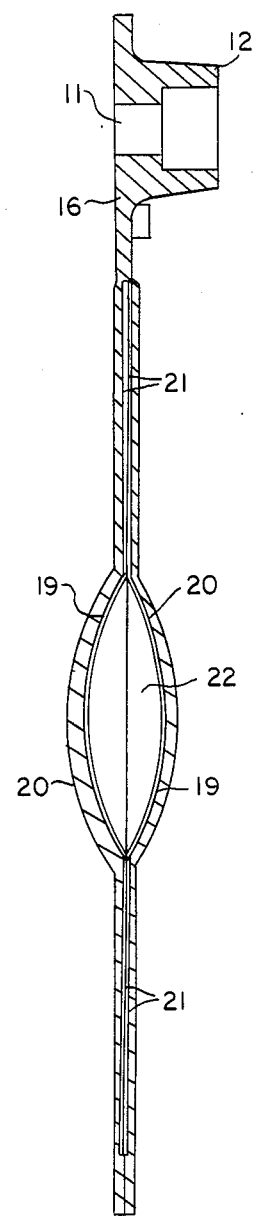
FIG. 6 is a cross-sectional elevation view of a modified form of the identification device.

Referring to FIG. 6 there is shown a modified form of the carrier. In this form a shell 22 of hard material is provided and the electronic device is located therewithin. When a SAW device is employed the antenna will of course extend out of the shell 22.

Preferably shell 22 is formed in two parts so as to facilitate installation therein of the electronic device. The two parts can be located and fastened together in any suitable known means e.g. gluing, snap lock, etc.

The shell is formed of any suitable material but is preferably a hard plastics material selected to withstand impact, high pressure etc. at varying degrees of high and low ambient temperature. By using such a protective shell the increased wall thickness of protrusion 20 can be omitted.

The identification device according to the present invention has a desirable degree of flexibility whilst still providing protection for the electronic componentry. The device is, however, of light weight and thus able to be carried on the ear of an animal.

I claim:

1. An electronic identification device comprising a carrier and an electronic transmitter located within said carrier, the carrier comprising a body portion, attachment means and a flexible portion coupling said attachment means with said body portion, the attachment means being adapted to facilitate attachment of the carrier to an object to be identified, the body portion, attachment means and coupling portion being integrally formed from a resilient plastics material, said body portion comprising two panels mounted to said coupling device, the panels being fastened together to form an internal cavity in which said electronic device is encapsulated there being protection means provided about said cavity to protect said encapsulated electronic device.

2. The device as claimed in claim 1 wherein the two body sections are placed in face to face contact and fastened together by high frequency welding.

3. The device as claimed in claim 1, wherein both panels are substantially elongated and have a recessed portion which combine when the panels are joined together to form the internal cavity in which the electronic device is encapsulated.

4. The device as claimed in claim 3 wherein the internal cavity is further formed by at least one additional recessed portion in each panel, said additional recessed portions being of shallower depth than said recessed portion and extending longitudinally therefrom, said additional recessed portions being so configured as to accommodate therein the antenna of said electronic device.

5. The device as claimed in claim 3 wherein the said projection means being formed by the cross-sectional thickness of the panel in which the recessed portion being located is greater than the cross-sectional thickness of the remainder of the panel.

6. The device as claimed in claim 5 wherein internal cavity is shaped such as to conform with the external shape of the electronic device.

7. The device as claimed in claim 6 wherein the cross-sectional thickness of the coupling portion is less than the combined cross-sectional thickness of the body portions.

8. The device as claimed in claim 3 wherein the protection means is a rigid shell which is positioned within the internal cavity, said electronic device being located within said rigid shell.

* * * * *